May 10, 1960  J. C. MASON  2,936,000
COMBINATION VALVE AND GAUGE ASSEMBLY
Filed July 5, 1957

John C. Mason, deceased
by Marion M. Mason, Administratrix
INVENTOR.

BY Francis A. Utecht, Jr.
ATTORNEY.

United States Patent Office 2,936,000
Patented May 10, 1960

2,936,000

COMBINATION VALVE AND GAUGE ASSEMBLY

John C. Mason, deceased, late of Bellflower, Calif., by Marion M. Mason, administratrix, Bellflower, Calif.

Application July 5, 1957, Serial No. 670,349

5 Claims. (Cl. 137—557)

The present invention relates generally to valves and more particularly to a novel and improved combination valve and gauge assembly.

It is a major object of the present invention to provide a combination valve and gauge assembly which is more rugged and durable than the heretofore proposed assemblies of this nature.

Another object is to provide a combination valve and gauge assembly which may be installed with considerably less labor and a shorter period of time than the heretofore proposed assemblies of this nature.

Another object is to provide a combination valve and gauge assembly which may be installed with considerably less labor and in a shorter period of time than the heretofore proposed assemblies of this nature.

Yet a further object of the invention is to provide a combination valve and gauge assembly which permits the gauge to be readily removed for inspection or repair.

An additional object is to provide a combination valve and gauge assembly of the aforedescribed nature which is provided with a safety bleeder which permits the fluid pressure to be safely released before disconnecting the gauge for inspection or repair.

Yet another object of the invention is to provide a combination valve and gauge assembly which is considerably more economical of construction than heretofore-proposed assemblies of this nature.

These and other objects and advantages of the present invention will become apparent from the following detailed description when taken in conjunction with the appended drawings wherein.

Figure 1:
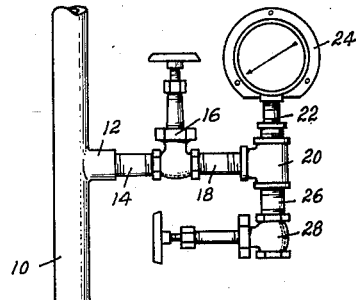
Figure 1 is a side elevational view showing a typical example of the heretofore proposed valve and gauge assemblies.

Referring first to Figure 1 of the drawings, there is shown a typical example of a heretofore proposed valve and gauge assembly. This valve and gauge assembly is depicted in conjunction with a pipe 10 adapted to transmit fluid under pressure. The pipe 10 is formed at a point along its length with an internally threaded T 12. This T 12 receives an externally threaded nipple 14. The opposite end of this nipple 14 is secured to the inlet side of a conventional gate valve 16. The outlet side of this gate valve 16 is connected to a second externally threaded nipple 18. This nipple 18 is threadably connected to the center leg of a T coupling 20. The upper leg of this T coupling 20 is threadably affixed to the stem 22 of a conventional pressure gauge 24. The lower leg of the T coupling 20 is threadably affixed to an externally threaded nipple 26. The lower end of the nipple 26 is received by a second conventional gate valve 28. The outlet of the second gate valve 28 is in communication with the atmosphere. It will be apparent that the aforedescribed combination valve and gauge assembly is not only bulky, but additionally is readily subject to damage. In this regard it frequently occurs that the nipple 14 is inadvertently broken away from the T 12. Upon such occurrence, the pressurized contents of the pipe 10 are released to the atmosphere. Where the fluid being conducted by the pipe 10 is of an inflammable nature an explosion or fire is likely to result.

The combined valve and gauge assembly of the present invention was developed in order to overcome the aforementioned disadvantages of the heretofore-proposed assemblies of this nature. Referring now to Figures 2 through 5, a preferred embodiment of a combination valve and gauge assembly embodying the present invention is shown in conjunction with a pipe 10 having an internally threaded T 12 similar to that shown in Figure 1. This assembly includes a valve generally designated V, a conventional pressure gauge G and a bracket B rigidly interconnecting the valve V and the gauge G. The valve V includes a generally elongated body 30 of hexagonal cross-section, one end of which is of cylindrical configuration and formed with external threads 32 so as to define a mounting member 34. The mounting member 34 is threadably received by the internally threaded T 12, as shown particularly in Figure 3. The valve body 30 is formed with a coaxial fluid passage 36, the front end of which is in communication with the interior of the pipe 10. The intermediate portion of the fluid passage 36 is internally threaded and receives an elongated valve stem 38. The front portion of the fluid passage 36 is formed with a generally frusto-conical seat 40 that receives the front end of the valve stem 38. The front end of the valve stem 38 is of a generally frusto-conical configuration, as indicated at 42, so as to be complementary to the valve seat 40. The valve stem 38 extends through the rear of the valve body 30 and is keyed to a handle 44. The rear portion of the fluid passage 36 merges into a coaxial internally threaded cavity 46. This cavity 46 receives the front portion of a packing gland 48. The packing gland 48 is externally threaded as indicated at 50 so as to receive a lock nut 52. The intermediate portion of the valve stem 38 is provided with packing 54 and forwardly of such packing the valve stem is formed with threads 55 engaged with the complementary internal threads formed in the intermediate portion of the fluid passage 36.

Down stream from the valve seat 40 the valve body 30 is formed with a radially extending port 56. This port is internally threaded so as to receive a complementary externally threaded nipple 58. The opposite end of the nipple 58 is connected to a gauge-actuating conduit 60. The opposite end of this conduit 60 is secured to a similar fitting 62. The latter fitting 62 is suitably connected with an elbow 64 by means of which the interior of the gauge G is placed in communication with the conduit 60.

Figure 4:
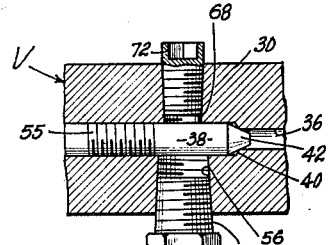
Figure 4 is a fragmentary central sectional view of the valve unit of said assembly.
Figure 2:
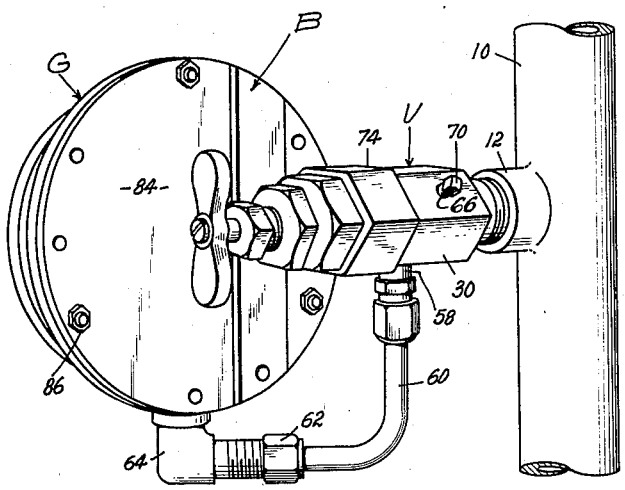
Figure 2 is a perspective view showing a preferred form of valve and gauge assembly embodying the present invention.
Figure 3:
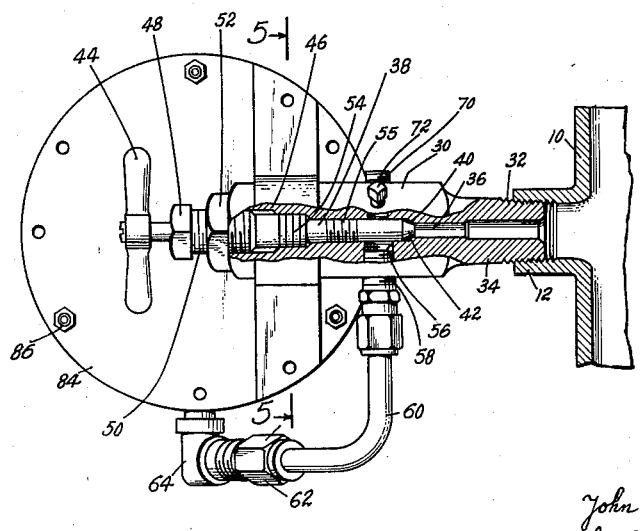
Figure 3 is a side elevational view of said valve and gauge assembly.

As shown particularly in Figure 4, the valve body 30 is also provided with an internally threaded bleeder port 66 and an internally threaded sampling port 68. The bleeder port 66 is normally closed by a plug element 70 while the sampler port 68 is normally closed by a plug element 72.

Figure 5:
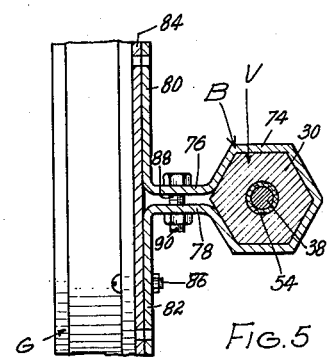
Figure 5 is an enlarged, fragmentary vertical section view of a bracket utilized with said assembly.

As shown particularly in Figure 5, the bracket B includes a band element 74 which encompasses the rear portion of the valve body 30. The ends of the band 74 merge into bifurcations 76 and 78 which extend away from the valve body 30 in a radial direction. Each merge into a pair of legs designated 80 and 82. These legs are rigidly affixed to disc plate 84. The disc plate 84 is adapted to supportably back the gauge G and is affixed thereto by a plurality of bolt and nut combinations 86. The bracket bifurcations 76 and 78 are formed with aligned bores 88. These bores 88 receive a bolt and nut combination 90. With this arrangement, the bracket band 74 may be readily slid upon the valve body 30 to the desired position. Thereafter, the bolt and nut combination 90 is tightened and the gauge G will be rigidly supported upon the valve V. The utilization of a hexagonal body together with the complementary hexagonal band element 74 insures against relative rotation between the bracket B and the valve V once the bolt and nut combination 90 has been tightened.

From the foregoing description it will be apparent that the valve and gauge assembly of the present invention provides many advantages over those heretofore proposed. It may be installed simply, quickly and easily and once installed it affords an extremely compact and rugged structure. Should it become necessary to remove the gauge G for inspection or repair it is only necessary to move the valve stem 38 to a closed position. Thereafter, the bleeder plug 70 is removed so any pressure can be safely released before the conduit 60 is disconnected from the gauge G. While the combination valve and gauge assembly is shown mounted horizontally, it can readily be mounted vertically or at any angle.

Various modifications and changes may be made with respect to the foregoing description without departing from the spirit of the invention or the scope of the following claims.

What is claimed is:

1. A combination valve and gauge assembly, comprising: a valve body formed with an internal fluid passage and having mounting means at one end; a seat formed at the intermediate portion of said fluid passage; a fluid outlet passage formed in said body downstream of said seat; a valve stem axially movably disposed in said body so as to be engageable with said seat and thereby control fluid flow through said fluid passage; a bracket having a band element encircling said body, the ends of said band element being connected to bifurcations that extend away from said body, with the ends of said bifurcations remote from said body being affixed to a gauge-receiving plate; threaded means interposed between said bifurcations for adjusting their relative spacing; and a gauge-actuating conduit extending from said outlet passage.

2. A combination valve and gauge assembly, comprising: a valve body formed with an internal fluid passage and mounting means at one end, a portion of said body being of polygonal cross-section; a seat formed at the intermediate portion of said fluid passage; a fluid outlet passage formed in said body downstream of said seat; a valve stem axially movably disposed in said body so as to be engageable with said seat and thereby control fluid flow through said fluid passage; a bracket having a polygonal band element encircling the polygonal cross-section portion of said body, the end of said band element being connected to bifurcations that extend away from said body, with the ends of said bifurcations remote from said body being affixed to a gauge-receiving plate; threaded means interposed between said bifurcations for adjusting their relative spacing; and a gauge-actuating conduit extending from said outlet passage.

3. A combination valve and gauge assembly, comprising: a valve body formed with an internal fluid passage and mounting means at one end, a portion of said body being of polygonal cross-section; a seat formed at the intermediate portion of said fluid passage; a fluid outlet passage formed in said body downstream of said seat; a valve stem axially movably disposed in said body so as to be engageable with said seat and thereby control fluid flow through said fluid passage; a bracket having a polygonal band element encircling the polygonal cross-section portion of said body, the end of said band element being connected to bifurcations that extend away from said body, with the ends of said bifurcations remote from said body being affixed to a gauge-receiving plate; a pair of aligned bores formed in said bifurcations; bolt and nut means in said bores for adjusting the relative spacing of said bifurcations; and a gauge-actuating conduit extending from said outlet passage.

4. A combination valve and gauge assembly, comprising: a valve body formed with an internal fluid passage and mounting means at one end, a portion of said body being of polygonal cross-section; a seat formed at the intermediate portion of said fluid passage; a fluid outlet passage formed in said body downstream of said seat; a valve stem axially movably disposed in said body so as to be engageable with said seat and thereby control fluid flow through said fluid passage; a bracket having a polygonal band element encircling the polygonal cross-section portion of said body; the end of said band element being connected to bifurcations that extend away from said body, with the ends of said bifurcations remote from said body being affixed to a gauge-receiving plate; a pair of aligned bores formed in said bifurcations; bolt and nut means in said bores for adjusting the relative spacing of said bifurcations; a bleeder port formed in said valve body downstream of said seat; a readily removable plug in said bore; and a gauge-actuating conduit extending from said outlet passage.

5. A combination valve and gauge assembly, comprising: a multi-sided valve body formed with an internal fluid passage and having mounting means at one end; a seat formed at the intermediate portion of said fluid passage; a fluid outlet passage formed in said body downstream of said seat; a valve stem axially movably disposed in said body so as to be engageable with said seat and thereby control fluid flow through said fluid passage; a bracket having a multi-sided band element non-rotatably encircling said body, the ends of said band element being connected to bifurcations that extend away from said body, with the ends of said bifurcations remote from said body being affixed to a gauge-receiving plate; threaded means interposed between said bifurcations for adjusting their relative spacing; and a gauge-actuating conduit extending from said outlet passage.

References Cited in the file of this patent

UNITED STATES PATENTS

| | | |
|---|---|---|
| 495,594 | Ludlow | Apr. 18, 1893 |
| 926,378 | Allison | June 29, 1909 |
| 1,036,539 | Bailie | Aug. 27, 1912 |
| 1,424,083 | Cole | July 25, 1922 |
| 1,548,186 | Claude | Aug. 4, 1925 |
| 1,767,167 | Brunow | June 24, 1930 |
| 1,820,120 | Collins | Aug. 25, 1931 |
| 1,945,760 | Strouf | Feb. 6, 1934 |
| 2,148,618 | Hallum | Feb. 28, 1939 |

FOREIGN PATENTS

| | | |
|---|---|---|
| 1,096,893 | France | Feb. 9, 1955 |